United States Patent
Liu et al.

(10) Patent No.: US 12,093,988 B2
(45) Date of Patent: Sep. 17, 2024

(54) SYSTEM, METHOD, AND COMPUTER READABLE MEDIUM FOR IMPROVING ECOMMERCE SEARCH RANKING VIA QUERY-PRICE AFFINITY VALUES

(71) Applicant: Walmart Apollo, LLC, Bentonville, AR (US)

(72) Inventors: Xinyi Liu, Secaucus, NJ (US); Varun Joshi, Hoboken, NJ (US); Jungwoo Han, Jersey City, NJ (US); Cun Mu, Jersey City, NJ (US); Rajyashree Mukherjee, San Carlos, CA (US)

(73) Assignee: Walmart Apollo, LLC, Bentonville, AR (US)

( * ) Notice: Subject to any disclaimer, the term of this patent is extended or adjusted under 35 U.S.C. 154(b) by 0 days.

(21) Appl. No.: 17/308,477

(22) Filed: May 5, 2021

(65) Prior Publication Data
US 2022/0358559 A1    Nov. 10, 2022

(51) Int. Cl.
  *G06Q 30/06*    (2023.01)
  *G06F 16/2457*  (2019.01)
  *G06F 16/9535*  (2019.01)
  *G06F 16/9538*  (2019.01)
  *G06Q 30/0601*  (2023.01)

(52) U.S. Cl.
  CPC ... *G06Q 30/0631* (2013.01); *G06F 16/24578* (2019.01); *G06F 16/9535* (2019.01); *G06F 16/9538* (2019.01)

(58) Field of Classification Search
  CPC . G06Q 30/06; G06Q 30/0601; G06Q 30/0631
  See application file for complete search history.

(56) References Cited

U.S. PATENT DOCUMENTS

| | | | |
|---|---|---|---|
| 7,797,303 B2 | 9/2010 | Roulland et al. | |
| 8,112,429 B2 | 2/2012 | Vadon et al. | |
| 8,571,921 B1* | 10/2013 | Choi | G06Q 30/02 705/348 |
| 11,238,115 B1* | 2/2022 | Newman | G06Q 30/0627 |
| 2011/0184928 A1* | 7/2011 | Vadon | G06F 16/9535 707/706 |
| 2019/0228451 A1 | 7/2019 | Shi et al. | |
| 2019/0370401 A1* | 12/2019 | Grant | H04W 4/70 |

OTHER PUBLICATIONS

Kathuria, A., Jansen, B. J., Hafernik, C., & Spink, A. (2010). Classifying the user intent of web queries using k-means clustering. Internet Research, 20(5), 563-581. doi:http://dx.doi.org/10.1108/10662241011084112.*

* cited by examiner

*Primary Examiner* — Jeffrey A. Smith
*Assistant Examiner* — Jennifer V Lee
(74) *Attorney, Agent, or Firm* — Morgan, Lewis & Bockius LLP; Manita Rawat

(57) ABSTRACT

A result ranking system can include a computing device that is configured to obtain a plurality of items based on a query and a value corresponding to each item of the plurality of items. The computing system can also be configured to retrieve a value distribution corresponding to the query and generated based on customer interaction data. The computing system can also, for each item of the plurality of items, determine a feature value based on the value distribution and the corresponding value of the item. The computing system can be further configured to transmit the plurality of items to a customer device for display in an arrangement based on the corresponding feature value.

18 Claims, 9 Drawing Sheets

SYSTEM, METHOD, AND COMPUTER READABLE MEDIUM FOR IMPROVING ECOMMERCE SEARCH RANKING VIA QUERY-PRICE AFFINITY VALUES

TECHNICAL FIELD

The disclosure relates generally to systems and methods for improving ecommerce search ranking via query-price affinity values.

BACKGROUND

Typically, search engines and systems return a group of items based exclusively on a query supplied by the requesting customer. For example, when a customer is searching for a particular item on an ecommerce marketplace, the customer may enter a query string into a search field that indicates a description of the particular item. The search system then returns a set of items only based on the query string, where the items most relevant to the query string are displayed higher in the list of items. However, there may be substantial variance across the price range of items displayed to the customer.

That is, the search system may display items with costs that vary significantly from the average price range of the entire set of items identified as relevant to the query string, either higher or lower. The customer may not necessarily be interested in the higher or lower priced items because those items may be less relevant to the query (for example, lower priced accessories). Therefore, the price may indicate a lack of relevancy to the customer's query, resulting in reduced user engagement with the displayed items in the form of clicks, adding items to a cart, and/or orders. Since search systems may only return results based on the query, item price does not impact a display or order of the results, potentially displaying accessories at the top of the results, even though the accessories are significantly lower priced than the item for which the customer is searching.

SUMMARY

The embodiments described herein are directed to a result ranking system and related methods. The result ranking system can include a computing device that is configured to obtain a plurality of items based on a query and a value corresponding to each item of the plurality of items. The computing system can also be configured to retrieve a value distribution corresponding to the query and generated based on customer interaction data. The computing system can also, for each item of the plurality of items, determine a feature value based on the value distribution and the corresponding value of the item. The computing system can be further configured to transmit the plurality of items to a customer device for display in an arrangement based on the corresponding feature value.

In another aspect, determining the feature value for each item of the plurality of items includes identifying a minimum value threshold and a maximum value threshold based on the value distribution and determining a first feature value corresponds to the item in response to the corresponding value being between the minimum value threshold and the maximum value threshold.

In another aspect, the computing device obtains the plurality of items in response to receiving the query from the customer device.

In another aspect, the computing device is configured to, at a threshold interval, obtain a set of customer interaction data over a threshold period associated with a query category of the query, apply a ratio transformation to the set of customer interaction data, and generate the value distribution using the transformed customer interaction data and corresponding value of each element of the transformed customer interaction data.

In another aspect, each element of the set of customer interaction data corresponds to an interaction with an item, and the set of customer interaction data includes customer interaction data for each query included in the query category.

In another aspect, the computing device is configured to access a lookup table to identify each query included in the query category.

In another aspect, the value distribution corresponding to the query category is applied to each query included in the query category.

In another aspect, the computing device is configured to aggregate customer interaction data for each query included in the query category into the set of customer interaction data.

In another aspect, the elements of the customer interaction data include, for each query category, at least one of: (i) a number of item purchases, (ii) a number of item selections for purchase, and (iii) a number of item views.

In another aspect, the computing device is configured to generate the value distribution by determining a total number of customer interactions corresponding to a value based on the transformed customer interaction data and each element of the transformed customer interaction data corresponds to a respective value.

In various embodiments of the present disclosure, a method of ranking query results is provided. In some embodiments, the method can include obtaining a plurality of items based on a query and a value corresponding to each item of the plurality of items. The method also includes retrieving a value distribution corresponding to the query and generated based on customer interaction data. The method further includes, for each item of the plurality of items, determining a feature value based on the value distribution and the corresponding value of the item. The method additionally includes transmitting the plurality of items to a customer device for display in an arrangement based on the corresponding feature value.

In various embodiments of the present disclosure, a non-transitory computer readable medium is provided. The non-transitory computer readable medium can have instructions stored thereon, wherein the instructions, when executed by at least one processor, cause a device to perform operations that include obtaining a plurality of items based on a query and a value corresponding to each item of the plurality of items. The operations can also include retrieving a value distribution corresponding to the query and generated based on customer interaction data. The operations can further include, for each item of the plurality of items, determining a feature value based on the value distribution and the corresponding value of the item. The operations can additionally include transmitting the plurality of items to a customer device for display in an arrangement based on the corresponding feature value.

BRIEF DESCRIPTION OF THE DRAWINGS

The features and advantages of the present disclosures will be more fully disclosed in, or rendered obvious by, the following detailed descriptions of example embodiments. The detailed descriptions of the example embodiments are to be considered together with the accompanying drawings wherein like numbers refer to like parts and further wherein.

DETAILED DESCRIPTION

Figure 1:
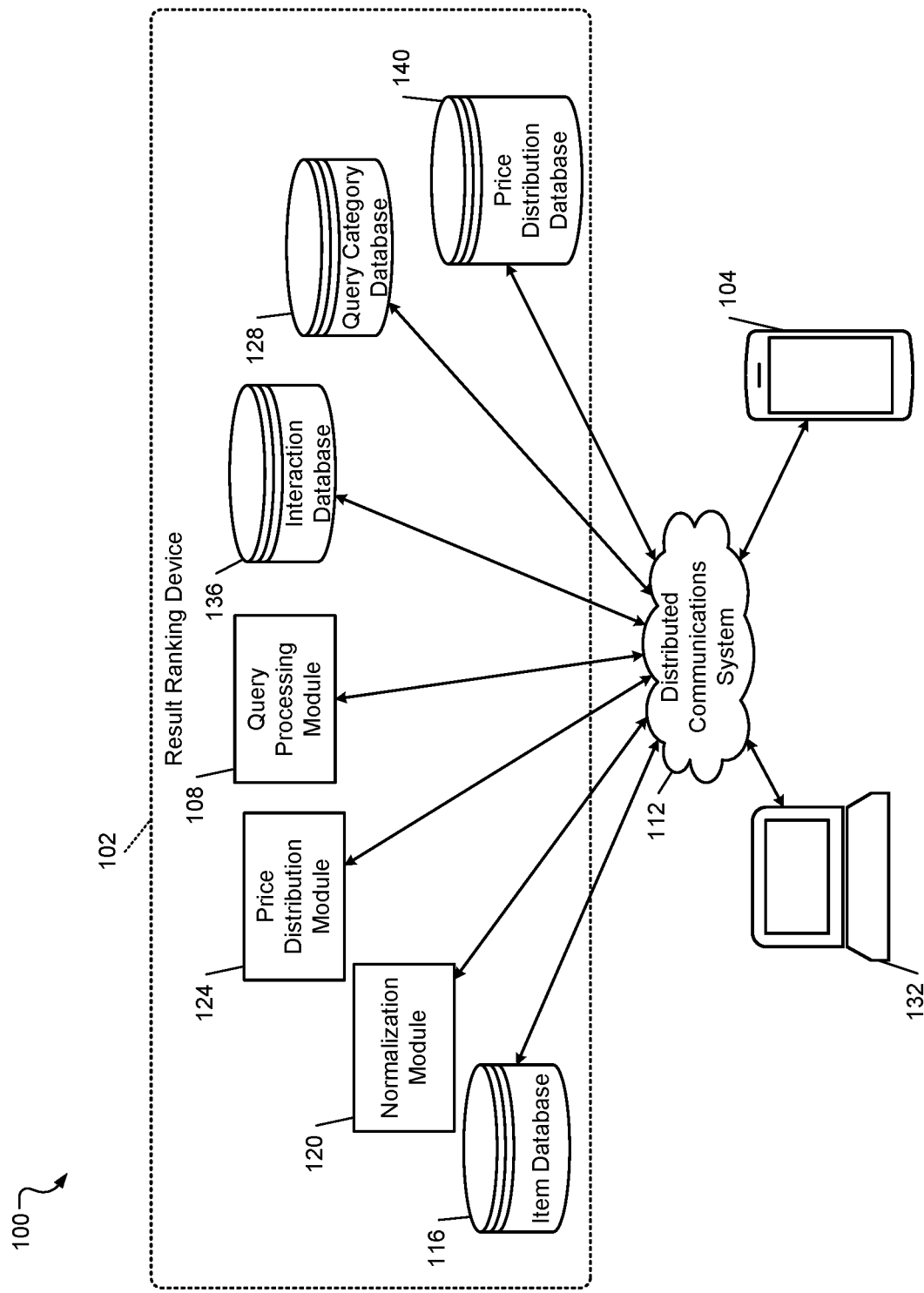
FIG. 1 is a block diagram of a result ranking system in accordance with some embodiments.

The description of the preferred embodiments is intended to be read in connection with the accompanying drawings, which are to be considered part of the entire written description of these disclosures. While the present disclosure is susceptible to various modifications and alternative forms, specific embodiments are shown by way of example in the drawings and will be described in detail herein. The objectives and advantages of the claimed subject matter will become more apparent from the following detailed description of these exemplary embodiments in connection with the accompanying drawings.

It should be understood, however, that the present disclosure is not intended to be limited to the particular forms disclosed. Rather, the present disclosure covers all modifications, equivalents, and alternatives that fall within the spirit and scope of these exemplary embodiments. The terms "couple," "coupled," "operatively coupled," "connected," "operatively connected," and the like should be broadly understood to refer to connecting devices or components together either mechanically, electrically, wired, wirelessly, or otherwise, such that the connection allows the pertinent devices or components to operate (e.g., communicate) with each other as intended by virtue of that relationship.

A result ranking system may be implemented in an ecommerce marketplace to arrange a display of item results according to a typical price range of the overall item results. That is, when a customer searches for an item to purchase, the result ranking system reorganizes how the item results are displayed to the customer to prevent items that fall outside of the typical price range from being displayed higher or earlier on the displayed item results. For example, a query for a particular item may return results of accessories associated with the particular item, such as a helmet when searching for a bicycle. Since the customer is searching for a bicycle and not a bicycle helmet, the result ranking system may identify the deviation in price between the average price of the item results and the price of bicycle helmets included in the item results. If the price of the returned bicycle helmets is outside of the typical range of prices for the item results, bicycle helmets will be ranked lower.

More specifically, the result ranking system implements a ranking model to apply a query-price affinity function to a real-time price of the search results or items. The query-price affinity function returns a feature value to indicate whether the item corresponds to a price that is too low or too high, indicating the item may not be relevant to the customer's query. Additionally, the result ranking system may implement a normalization strategy to identify and manage query categories to associate similar queries with a query category. In this way, customer interaction data for each query within a query category may be combined and used to determine the typical price range for the query category and, in turn, the associated queries within the query category.

Based on the customer interaction data, the result ranking system generates a price distribution or value distribution for each query category using a price distribution module. The price distribution module aggregates the customer interaction data corresponding to the queries within the query categories and transforms the customer interaction data to generate the price distribution based on a number of customer interactions (or density) versus price. For example, the customer interaction data may include orders, add to cart selections, and viewing selections resulting from the queries included in the query category. Further, the transformation to the customer interaction data may include weighting the interaction data based on the interaction type, such as weighting ordering an item more heavily than viewing an item. Based on the price distribution for a query, the result ranking system can rank item prices, using the computed feature value, that are outside the typical price range as lower to include those out of range items lower on the display of item results.

Referring to FIG. 1, a block diagram of a result ranking system 100 is shown. The result ranking system 100 may include a result ranking device 102 and a customer device 104, such as a phone, tablet, laptop, mobile computing device, desktop, etc., that interacts with the result ranking device 102 via a distributed communications system 112. A customer may submit a query via the customer device 104 and receive query results displayed on the customer device 104 retrieved using the result ranking device 102. The result ranking device 102 includes a query processing module 108, which accesses an item database 116 to retrieve item identifiers or items relevant to a query input by a customer via the customer device 104. The customer may navigate to a website, for example, an ecommerce marketplace, using the customer device 104 associated with a particular entity. On the website, the customer may enter a search string or a query including terms indicating or related to an item to retrieve search results including the related item. The query processing module 108 may obtain a set of items from the item database 116 that correspond to the query. The result ranking system 100 also includes a normalization module 120 and a price distribution module 124 to organize search results based on the items that are more relevant to the customer's query and more likely to be items that the customer wishes to engage with.

For example, the normalization module 120 may identify related queries and categorize the related queries into certain query categories. The query categories and the associated queries are stored in a query category database 128. The query category database 128 may include a lookup table with a variety of queries within a category in order to track and combine customer interaction data associated with a query category. For example, a query category may be "26 inch mens bicycles" and may correspond to a set of variations of the query category, including: 26 in mens bike, 26 inch men bicycle, 26 inch men's bike, 26 inch mens bike, 26 inch mens bikes, mens bicycle 26", mens bicycles 26 inch, etc. In various implementations, an analyst associated with an entity or the ecommerce marketplace, for example, using an analyst device 132, may review queries submitted by customers via the customer device 104. The analyst may categorize queries into a set of categories in the query category database 128. Additionally or alternatively, the analyst may create new query categories included in the query category database 128 by analyzing recent queries, generating different versions of queries, etc.

In some implementations, the normalization module 120 may implement machine learning algorithms, such as natural language processing, to identify queries that correspond to one another or belong in a query category based on salient terms analysis. For example, the normalization module 120 may identify similar queries to a query input into the customer device 104 using natural language processing and k-means clustering to determine a similarity between previously searched queries and/or queries within existing query categories. For those queries that are within a similarity threshold of one another, the normalization module 120 may indicate that the queries are within the same query category for normalization purposes. The normalization module 120 may update the query category database 128 to include a new query in a particular category. The result ranking device 102 may further be configured to execute the normalization module 120 at threshold intervals to analyze received queries over a threshold period, for example, the last 24 hours, the last week, etc., to identify whether new queries should be categorized in a new or existing query category. In this way, the result ranking device 102 can track customer interactions at a query category level instead of only at a query level, increasing a volume of customer interaction data to analyze for each query within the query category.

The price distribution module 124 may, at threshold intervals, such as daily, weekly, etc., analyze customer interaction data stored in an interaction database 136 to generate a price distribution of items corresponding to received queries over a threshold period, for example, the last 120 days. The customer interaction data stored and tracked may include selections of items or views, adding an item to the cart, purchasing an item, or any other user interface interaction with search results retrieved in response to the customer submitting a query. To improve the generated price distribution by increasing the amount of customer interaction data, the price distribution module 124 combines or aggregates the customer interaction data stored in the interaction database 136 by query category.

Then, the price distribution generated for each query category corresponds to each query within the query category and is stored in a price distribution database 140 for use during real-time return of search results to more optimally organize the search results, improving user experience with the ecommerce marketplace. That is, the query processing module 108 may obtain the relevant price distribution based on the query from the price distribution database 140 when a customer submits a query via the customer device 104. The query processing module 108 may then rank or order the search results displayed to the customer on a user interface of the customer device 104 using the corresponding price distribution of the query and a query-price affinity function, to provide the customer with items that are within the standard price ranges of items returned for the submitted query.

The result ranking device 102, the customer device 104, and analyst device 132 can each be any suitable computing device that includes any hardware or hardware and software combination for processing and handling information. For example, the term "device" and/or "module" can include one or more processors, one or more field-programmable gate arrays (FPGAs), one or more application-specific integrated circuits (ASICs), one or more state machines, digital circuitry, or any other suitable circuitry. In addition, each can transmit data to, and receive data from, the distributed communications system 112. In various implementations, the devices, modules, and databases may communicate directly on an internal network.

As indicated above, the result ranking device 102, the customer device 104, and/or the analyst device 132 can be a computer, a workstation, a laptop, a server such as a cloud-based server, or any other suitable device. In some examples, the customer device 104 and/or the analyst device 132 can be a cellular phone, a smart phone, a tablet, a personal assistant device, a voice assistant device, a digital assistant, a laptop, a computer, or any other suitable device. In various implementations, the result ranking device 102, including all the modules and databases, is on a central computing system that is operated and/or controlled by a retailer. The result ranking device 102 may include modules to execute purchases for items selected by customers using the customer device 104. Additionally or alternatively, the modules and databases of the result ranking device 102 are distributed among one or more workstations or servers that are coupled together over the distributed communications system 112.

The described modules and databases of the result ranking device 102 can cause an ecommerce marketplace to be displayed or otherwise communicated to the customer device 104 via one or more websites. Customers can view, browse, and order items that may be made available for purchase via the ecommerce marketplace. The result ranking device 102 can collect information for such purchases or orders including item information, payment information, delivery information, and the like via additional modules and databases. Similarly, the result ranking device 102 can store such information and/or send such information for storage in additional databases of the result ranking device 102.

The databases described can be remote storage devices, such as a cloud-based server, a memory device on another application server, a networked computer, or any other suitable remote storage. Further, in some examples, the databases can be a local storage device, such as a hard drive, a non-volatile memory, or a USB stick.

The distributed communications system 112 can be a WiFi® network, a cellular network such as a 3GPP® network, a Bluetooth® network, a satellite network, a wireless local area network (LAN), a network utilizing radio-frequency (RF) communication protocols, a Near Field Communication (NFC) network, a wireless Metropolitan Area Network (MAN) connecting multiple wireless LANs, a wide area network (WAN), or any other suitable network. The distributed communications system 112 can provide access to, for example, the Internet.

The customer device 104 and the analyst device 132 may communicate with the result ranking device 102 over the distributed communications system 112. For example, the result ranking device 102 may host one or more websites.

The customer device 104 and the analyst device 132 may be operable to view, access and interact with the websites hosted by the result ranking device 102. In some examples, the result ranking device 102 can allow a customer, via the customer device 104, to browse, search, and/or select products for purchase. As will be further explained, the result ranking device 102 can also display items in a particular, ranked order via the customer device 104. The order of the displayed items indicates an item relevance to the customer-submitted query, determined from customer interaction data corresponding to the query and the price distribution of related items.

Figure 2:
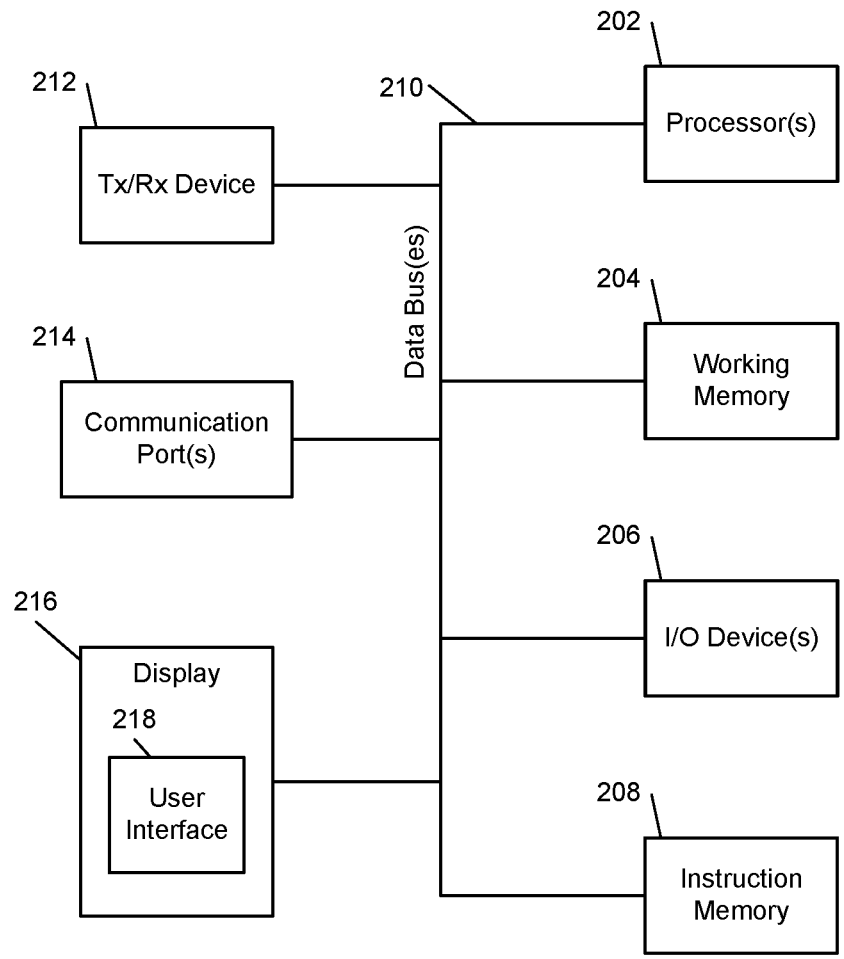
FIG. 2 is a block diagram of a computing device implementing the result ranking device of FIG. 1 in accordance with some embodiments.

FIG. 2 illustrates an example computing device 200. The result ranking device 102, the customer device 104, and/or the analyst device 132 may include the features shown in FIG. 2. For the sake of brevity, FIG. 2 is described relative to the result ranking device 102.

As shown, the result ranking device 102 can be a computing device 200 that may include one or more processors 202, working memory 204, one or more input/output devices 206, instruction memory 208, a transceiver 212, one or more communication ports 214, and a display 216, all operatively coupled to one or more data buses 210. Data buses 210 allow for communication among the various devices. Data buses 210 can include wired, or wireless, communication channels.

Processors 202 can include one or more distinct processors, each having one or more cores. Each of the distinct processors can have the same or different structure. Processors 202 can include one or more central processing units (CPUs), one or more graphics processing units (GPUs), application specific integrated circuits (ASICs), digital signal processors (DSPs), and the like.

Processors 202 can be configured to perform a certain function or operation by executing code, stored on instruction memory 208, embodying the function or operation. For example, processors 202 can be configured to perform one or more of any function, method, or operation disclosed herein.

Instruction memory 208 can store instructions that can be accessed (e.g., read) and executed by processors 202. For example, instruction memory 208 can be a non-transitory, computer-readable storage medium such as a read-only memory (ROM), an electrically erasable programmable read-only memory (EEPROM), flash memory, a removable disk, CD-ROM, any non-volatile memory, or any other suitable memory.

Processors 202 can store data to, and read data from, working memory 204. For example, processors 202 can store a working set of instructions to working memory 204, such as instructions loaded from instruction memory 208. Processors 202 can also use working memory 204 to store dynamic data created during the operation of the result ranking device 102. Working memory 204 can be a random access memory (RAM) such as a static random access memory (SRAM) or dynamic random access memory (DRAM), or any other suitable memory.

Input-output devices 206 can include any suitable device that allows for data input or output. For example, input-output devices 206 can include one or more of a keyboard, a touchpad, a mouse, a stylus, a touchscreen, a physical button, a speaker, a microphone, or any other suitable input or output device.

Communication port(s) 214 can include, for example, a serial port such as a universal asynchronous receiver/transmitter (UART) connection, a Universal Serial Bus (USB) connection, or any other suitable communication port or connection. In some examples, communication port(s) 214 allows for the programming of executable instructions in instruction memory 208. In some examples, communication port(s) 214 allow for the transfer (e.g., uploading or downloading) of data, such as query/search results and customer interaction data.

Display 216 can display a user interface 218. User interfaces 218 can enable user interaction with the result ranking device 102. For example, user interface 218 can be a user interface that allows an operator to interact, communicate, control and/or modify different features or parameters of the result ranking device 102. The user interface 218 can, for example, display the performance of the result ranking device 102 using different textual, graphical or other types of graphs, tables or the like. In some examples, a user can interact with user interface 218 by engaging input-output devices 206. In some examples, display 216 can be a touchscreen, where user interface 218 is displayed on the touchscreen.

Transceiver 212 allows for communication with a network, such as the distributed communications system 112 of FIG. 1. For example, if the distributed communications system 112 of FIG. 1 is a cellular network, transceiver 212 is configured to allow communications with the cellular network. In some examples, transceiver 212 is selected based on the type of distributed communications system 112 in which the result ranking device 102 will be operating. Processor(s) 202 is operable to receive data from, or send data to, a network, such as the distributed communications system 112 of FIG. 1, via transceiver 212.

Figure 3:
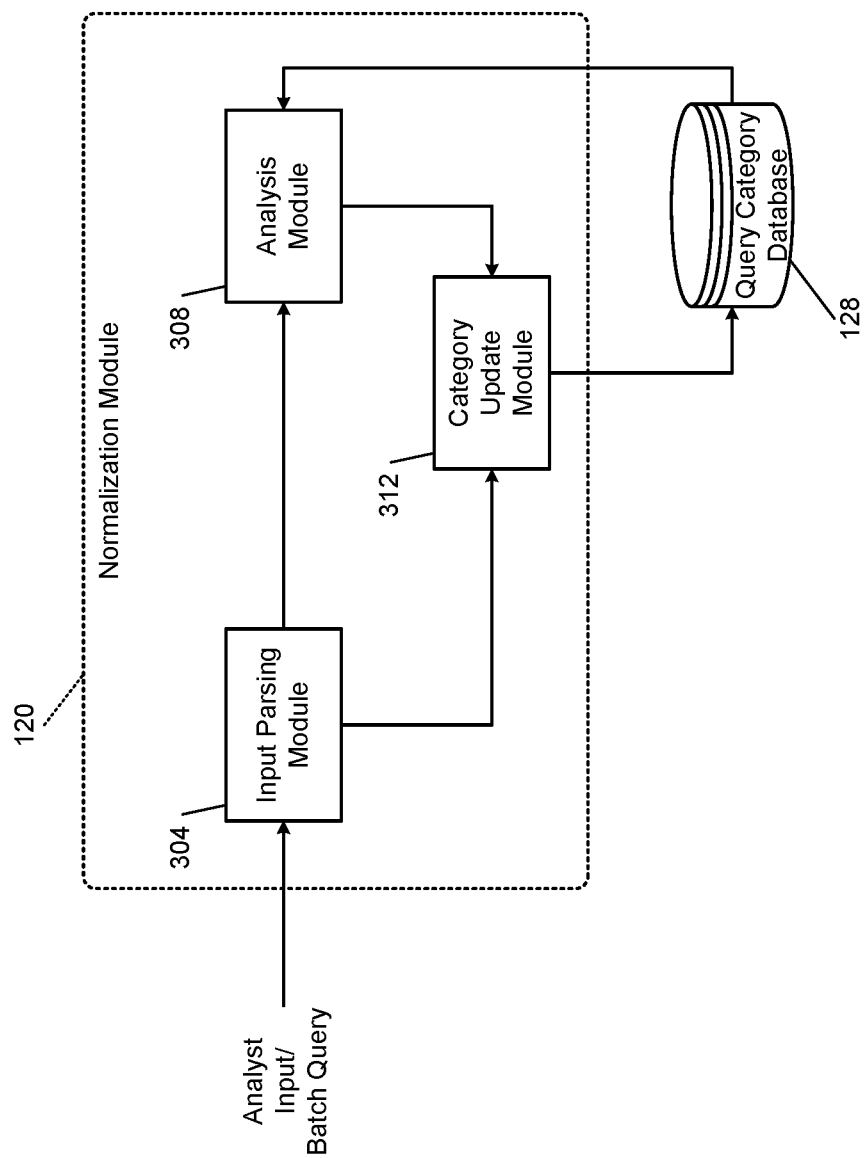
FIG. 3 is a block diagram illustrating an example of a normalization module of the result ranking device of FIG. 1 in accordance with some embodiments.

Referring to FIG. 3, further aspects illustrating an example normalization module 120 are shown. As described previously, the normalization module 120 may receive input from an analyst (for example, from the analyst device 132 of FIG. 1) to update the query categories stored in the query category database 128 or may obtain a batch of queries received over a threshold period, such as a previous 24 hours, and at a threshold interval, for example, after the 24 hours, analyze the received queries to identify new query categories or a query category to which new queries belong.

In either implementation, an input parsing module 304 of the normalization module 120 receives the input and determines an input type. In response to the input being an individual or a set of queries, the input parsing module 304 forwards the input to an analysis module 308. The analysis module 308 may implement a machine learning algorithm, such as natural language processing, to identify salient terms and classify the one or more queries into a query category obtained from the query category database 128.

The analysis module 308 may implement structured and/or unstructured machine learning to classify the one or more queries as well as identify a new query category. The analysis module 308 forwards the determined query category of the input queries as well as any new query category that has been identified to a category update module 312. The category update module 312 updates the query category database 128 to add any new queries to an established query category or begin a new query category.

In response to the input parsing module 304 identifying the input as an analyst update, the input parsing module 304 forwards the analyst update to the category update module 312. The category update module 312 adds the analyst input, such as adding a particular query to an established query category or creating a new query category to the query category database 128. In various implementations, the terms used to define the query category may be salient terms to determine whether a new query should be categorized in that query category.

Figure 4:
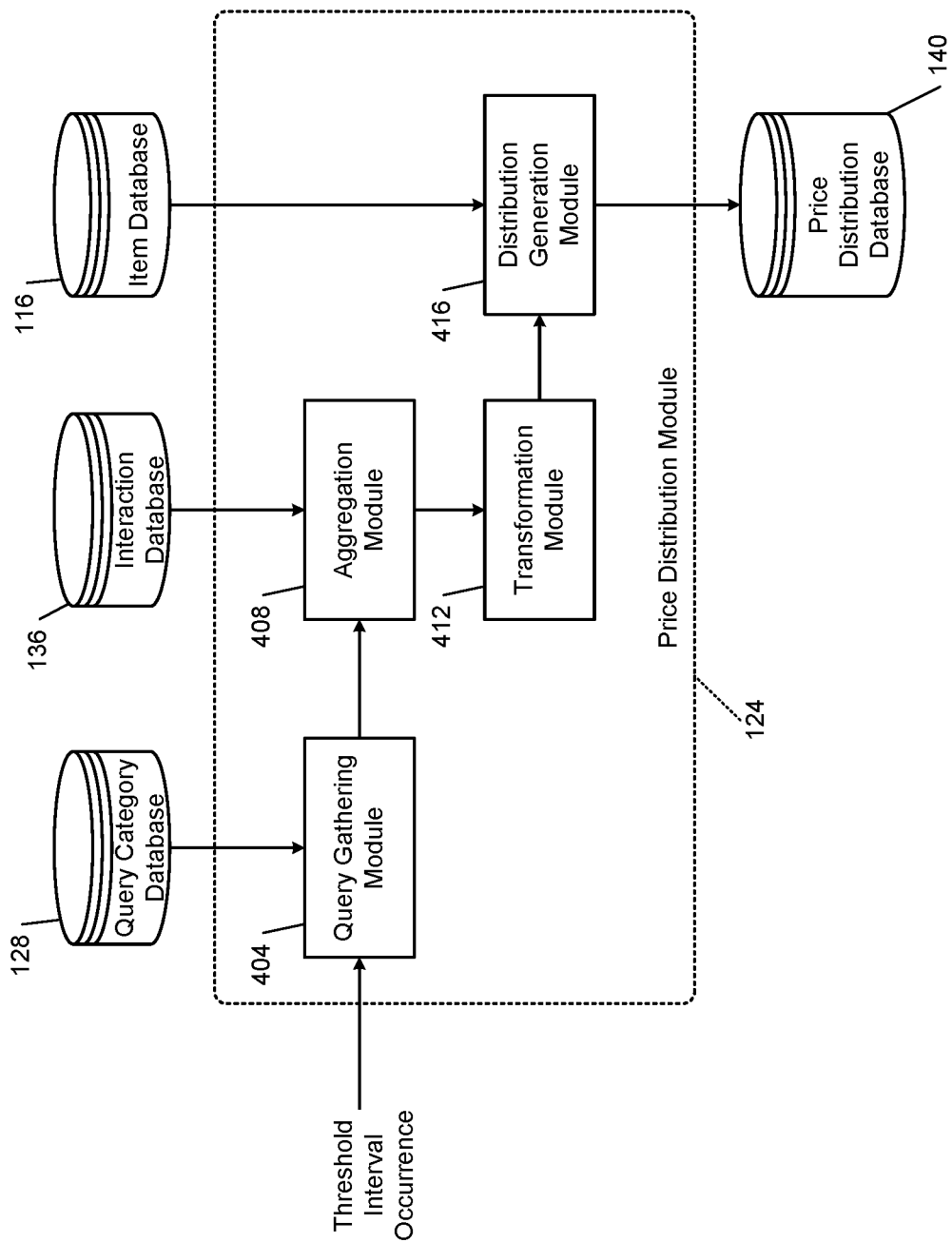
FIG. 4 is a block diagram illustrating an example a price distribution module of the result ranking device of FIG. 1 in accordance with some embodiments.

Referring now to FIG. 4, an example price distribution module 124 of the result ranking device 102 is shown. As mentioned previously, the price distribution module 124 generates and updates price distributions for query categories stored in the query category database 128 at threshold intervals, for example, daily, hourly, weekly, each morning at 6:00 AM, or another set time. The threshold interval occurrence prompts a query gathering module 404 of the price distribution module 124 to obtain a set of query categories stored in the query category database 128 along with each query associated with each query category.

The query categories and corresponding queries are forwarded to an aggregation module 408. The aggregation module 408 obtains customer interaction data from the interaction database 136 for each query within a query category. The customer interaction data obtained within each query category is combined. The customer interaction data may include, for each query, (i) views, meaning a number of selections or clicks to view an item returned in the query results, (ii) add to carts, meaning a number of times "add to cart" was selected for one of the items returned in the query results, and/or (iii) purchase, meaning a number of times a purchase was executed for one of the items returned in the query results.

The aggregation module 408 combines for each query in a query category a number of views, a number of add to carts, and a number of purchases. In this way, the aggregated customer interaction data for similar queries can be used to generate price distributions for all the queries within the query category. Additionally, the aggregation module 408 can forward the aggregated customer interaction data to a transformation module 412 but only for the query categories with a number of views above a threshold number, for example, 30 views. The aggregation module 408 only forwards the customer interaction data for categories with a certain number of views because, without enough customer interaction data within the query category, the price distribution for the existing customer interaction data may not be accurate. That is, if all queries within a query category did not result in a customer even clicking on a result, the returned results may have not been relevant to the customer's query or interest. Therefore, the price distribution of the items returned for the query may not be relevant either.

The transformation module 412 receives the aggregated customer interaction data according to query category. The transformation module 412 applies a ratio transformation to each set of customer interaction data to weight the data accordingly. In various implementations, the transformation module 412 may weight a purchase interaction higher than an add to cart interaction and an add to cart interaction higher than a view interaction.

For example, the number of purchase interactions for a query category may be multiplied by a threshold order weight, such as 10, while the number of add to cart interactions for a query category may be multiplied by a threshold cart weight, such as 4. Further, for example, the transformation module 412 may not multiply the number of views for a query category so that the number of views excludes any weighting or additional emphasis. That is, within a particular query category and as a result of a query within the query category returning a set of results, an item may have been viewed, added to cart, and purchased. Therefore, for this particular item, the transformed customer interaction data would include 1 viewing, 4 add to cart (weighted by 4), and 10 purchases (weighted by 10), resulting in a total of 15 interactions for the price of the item corresponding to the particular query. This ratio transformation is applied to each individual customer interaction data.

The transformed customer interaction data for each query category may then be forwarded to a distribution generation module 416. The distribution generation module 416 may obtain item pricing information for items, for example, from the item database 116, corresponding to the customer interaction data and determine a price distribution for the query category, indicating a density or amount of customer interactions at each price interval for the query category. For example, each interaction within the customer interaction data corresponding to an item priced or valued at $200 may be combined to indicate a density value or interaction amount.

Therefore, in the example above for the item with 1 viewing (multiplied by ratio value 1), 1 add to cart (multiplied by ratio value 4), and 1 purchase (multiplied by ratio value 10), the price distribution would include a density value of 15 (1+4+10) for the corresponding item price. For each item with a same corresponding price, the customer interaction data is combined to indicate additional interaction with an item at the corresponding price. The distribution generation module 416 stores price distributions for each query category within the price distribution database 140. As noted previously, the price distributions may be generated and updated on a regular basis, such as daily.

Figure 5:
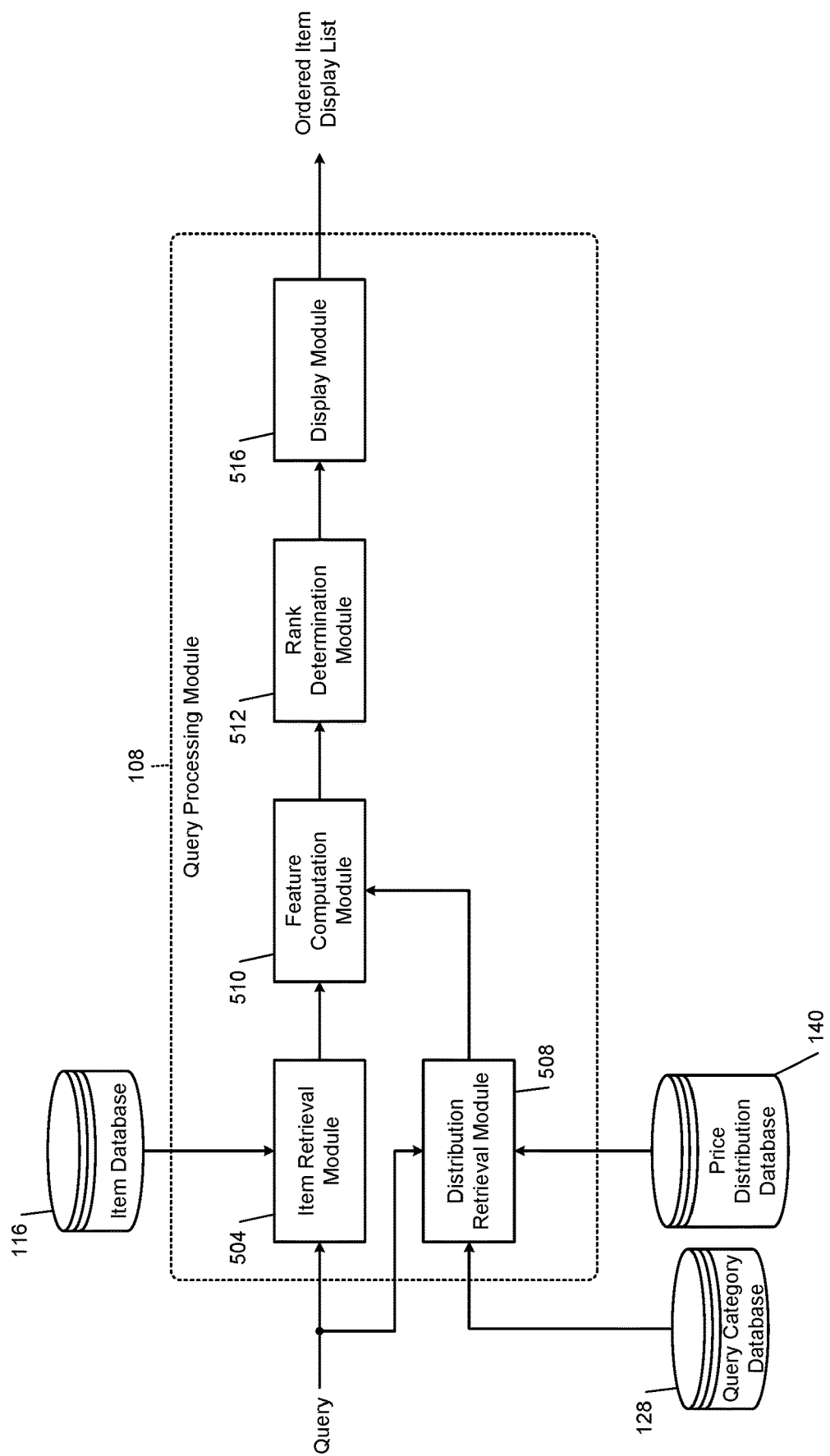
FIG. 5 is a block diagram illustrating an example of a query processing module of the result ranking device of FIG. 1 in accordance with some embodiments.

Referring now to FIG. 5, an example query processing module 108 of the result ranking device 102 is shown. The query processing module 108 may operate in real-time to retrieve present pricing information of items or item identifiers included in search results. A query, for example, from the customer device 104, may be received by an item retrieval module 504 and a distribution retrieval module 508 of the query processing module 108. The item retrieval module 504 obtains item identifiers from the item database 116 based on the query, for example using national language processing techniques that use salient terms in the query to retrieve relevant item identifiers based on item description. The item database 116 may include, for items offered by an ecommerce marketplace, item identifiers that indicate or include key terms corresponding to the item, item description, price, an image, etc. Once relevant item identifiers are obtained, the item retrieval module 504 forwards the item identifiers to a feature computation module 510.

Returning to the distribution retrieval module 508, the distribution retrieval module 508 determines a query category of the query by comparing the query to query categories included in the query category database 128. The query category database 128 may include a lookup table with existing queries and to which query category the query corresponds. The distribution retrieval module 508 can obtain the price distribution for the identified query category from the price distribution database 140. In various implementations, if the query is not included in the query category database 128 and/or the query category is not included in the price distribution database 140, the distribution retrieval module 508 may forward a skip indicator to the feature computation module 510, indicating a price distribution would not available and, therefore, a feature value would not be computed.

The feature computation module 510 identifies, within the retrieved price distribution, a lower price value and a high price value. For example, the feature computation module 510 may determine the lower price value as a price cutoff where 2.5% density of the price distribution is below the lower price value and the higher price value as a price cutoff where 2.5% density of the price distribution is above the higher price value. Using the lower price value and the higher price value, feature computation module 510 may determine a feature value for each price of items or item retrieved by the item retrieval module 504 to use as a parameter when determining a display order or arrangement of the different items.

The feature value for each item may be determined using the below price-affinity function:

$$\text{feature value} = \left( \frac{|P_\beta - P_\alpha| + \theta_1 \cdot \max(0, P_\alpha - x) + \theta_2 \cdot \max(0, x - P_\beta)}{|x - P_\alpha| + |P_\beta - x|} \right)^\gamma,$$

$$\theta_1, \theta_2 \in (0, 2), \gamma \in (0, 1),$$

where x is the price of the item (obtained by the item retrieval module 504 in real-time), $P_\alpha$ is the lower price value, $P_\beta$ is the higher price value, $\theta_1$ is a lower price influencer, $\theta_2$ is a higher price influencer, and $\gamma$ is a punishment value.

The above query-price affinity function results in the feature value of all items between the lower price value and the higher price value being the equal (for example, 1). The function also results in the items with prices outside of the lower price value and higher price value range having a lower feature value, impacting the ranking performed by a rank determination module 512, resulting in a lower ranking for the items. Therefore, while relevance based on original result ranking (such as relevance to the query) along with a plurality of other features (such as number of clicks, item popularity, etc.) also influence a rank, the rank determination module 512 may re-rank the items to arrange the items displayed to the customer based on the feature value calculated by the feature computation module 510. That is, items priced outside of the lower price value and higher price value being below items within the preferred range (between the lower price value and the higher price value). Further, $\theta_1$, $\theta_2$, and $\gamma$ may be preset and impact by how much the item feature value is reduced.

For example, $\theta_1$ impacts the feature value of items priced below the lower price range by reducing the feature value range as $\theta_1$ approaches 2. Similarly, $\theta_2$ impacts the feature value of items priced above the higher price range by also reducing the feature value range as $\theta_2$ approaches 2. Additionally, $\gamma$ impacts feature values below the lower price value and above the higher price value similarly: the higher $\gamma$ is, a price below the lower price value reduces in feature value as the price decreases and a price above the higher price value reduces in feature value as the price increases. Therefore, the punishment value reduces the feature value of those items with prices further from the preferred range when the punishment value is closer to 1.

The rank determination module 512 receives the feature values computed by the feature computation module 510 and ranks or re-ranks the items displayed to the customer. In various implementations, the rank determination module 512 receives the feature values along with a plurality of pre-computed values and implements a machine learning algorithm to predict a rank of each item for display to the customer. For example, the rank determination module 512 may receive, in addition to the feature value, an indication of item popularity, a number of clicks, a number of orders, item availability, etc. The rank determination module 512 forwards the rankings to a display module 516 that arranges and orders the item identifiers corresponding to the query into an ordered item display list based on the ranks determined by the rank determination module 512. The display module 516 forwards the ordered item display list to a user interface of the customer device 104 for display.

Figure 6:
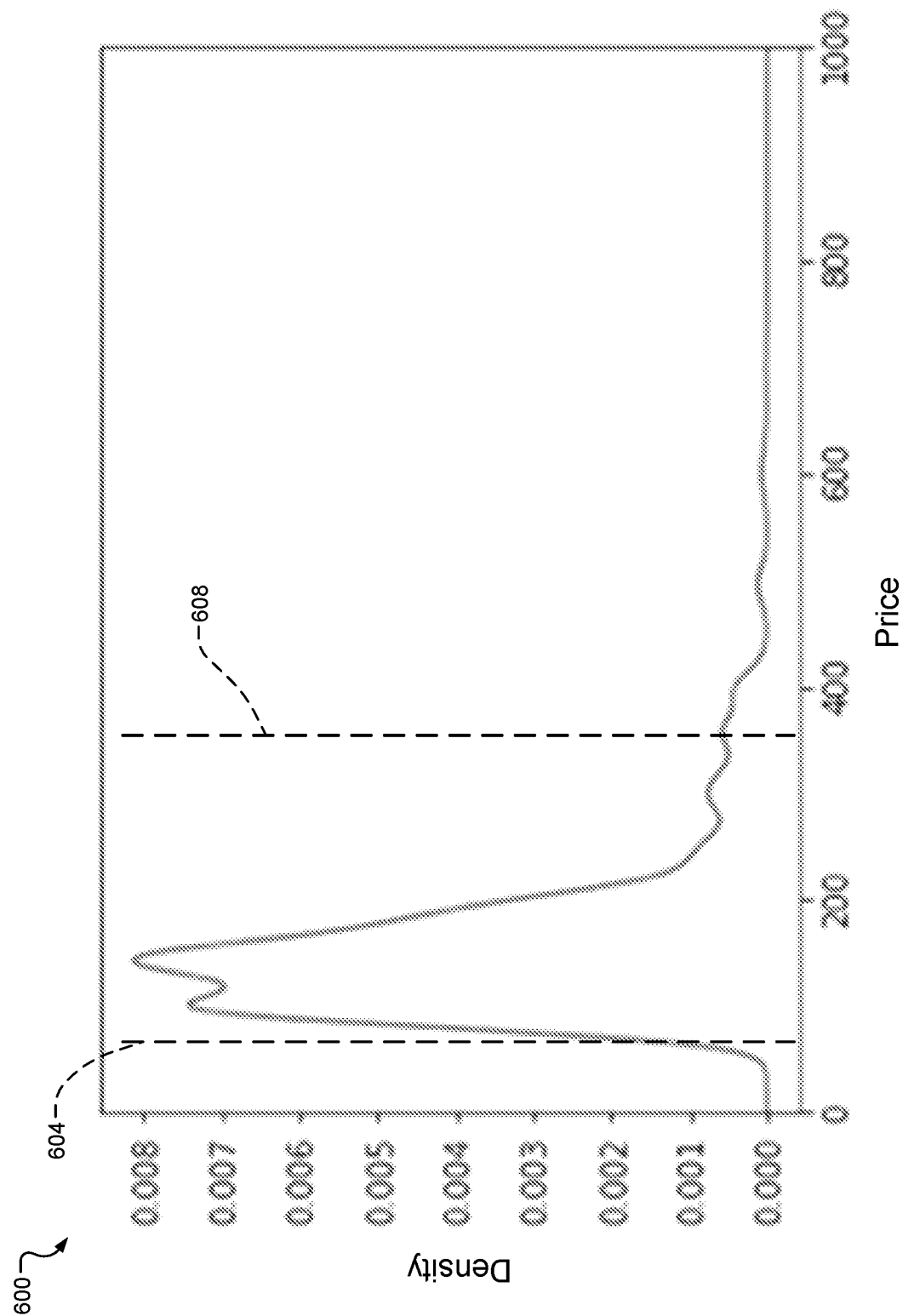
FIG. 6 is a graphical depiction of an example price distribution graph.

Referring now to FIG. 6, a graphical depiction of an example price distribution graph 600 is shown. As previously described, the price distribution graph 600 depicts a density of customer interactions of items by price range. For example, as shown in FIG. 6, the density may represent a percentage of customer interactions of items at a particular price. As shown, the majority of customer interactions occur between a lower price value 604 and a higher price value 608. The lower price value 604 may represent a cutoff where prices below the lower price value 604 account for 2.5% of the customer interactions and the higher price value 608 may represent a cutoff where prices above the higher price value 608 account for 2.5% of the customer interactions.

Figure 7:
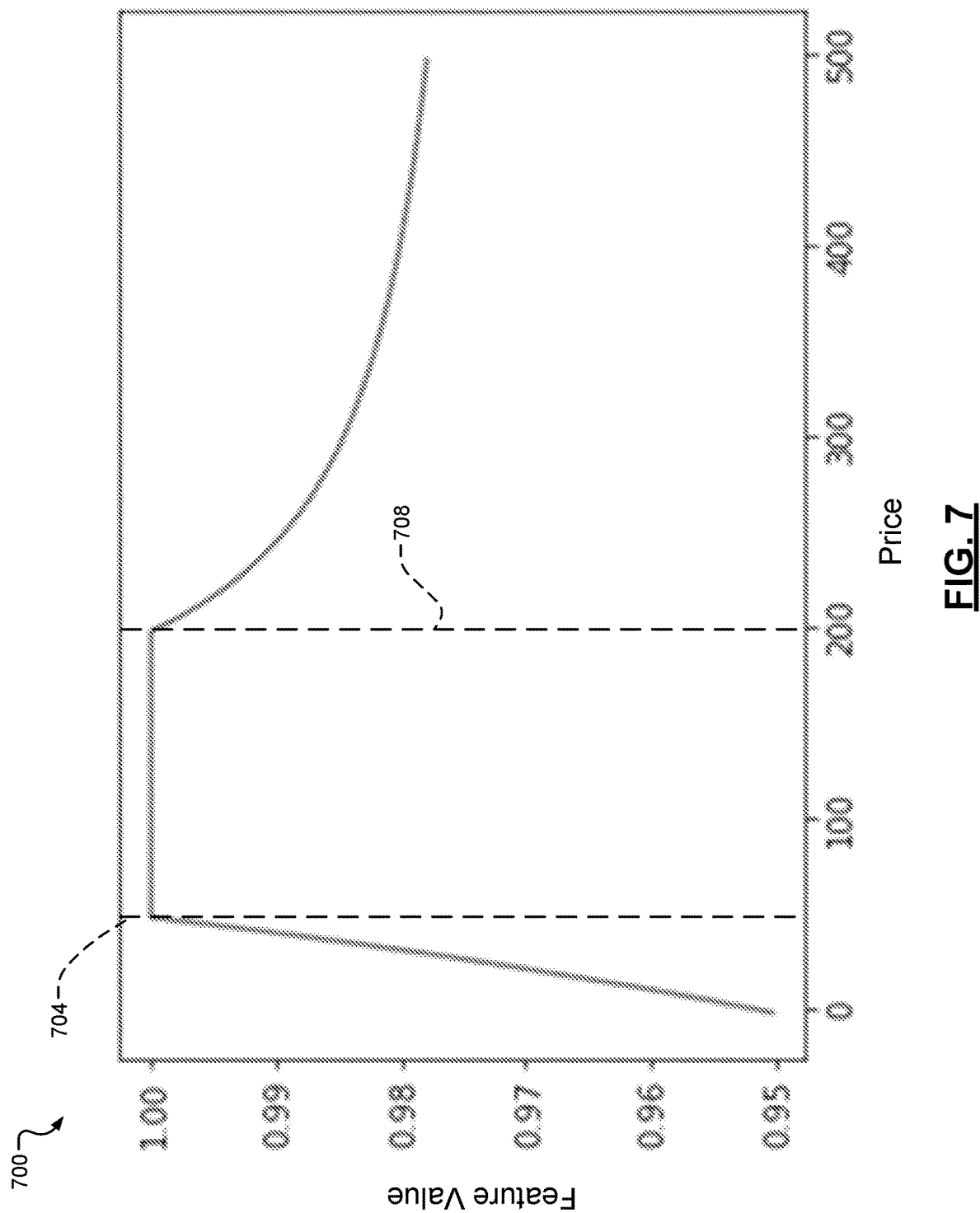
FIG. 7 is a graphical depiction of an example price-affinity ranking graph.

Referring now to FIG. 7, a graphical depiction of an example price-affinity feature graph 700 is shown. The price-affinity features graph 700 graphs the feature values of items at varying prices, wherein $\theta_1=0$, $\theta_2=1.5$, and $\gamma=0.1$. As is shown, items priced between a lower price value 704 and a higher price value 708 have a feature value of 1. Therefore, the feature value for those items does not reduce the ranking of those items. Those items with prices below the lower price value 704 have a reduced feature value, reducing the ranking. Further, those items with prices above the higher price value 708 also have a reduced feature value, reducing the ranking; however, the feature value of those items priced above the higher price value 708 reduce in feature value at a slower pace, due to $\theta_2=1.5$, slowing the reduction. Those items with a reduced feature value may be displayed after the items with a feature value of 1 as the price indicates that items below the lower price value 704 and above the higher price value 708 are less relevant to the query and/or the customer will be less interested in those items.

Figure 8:
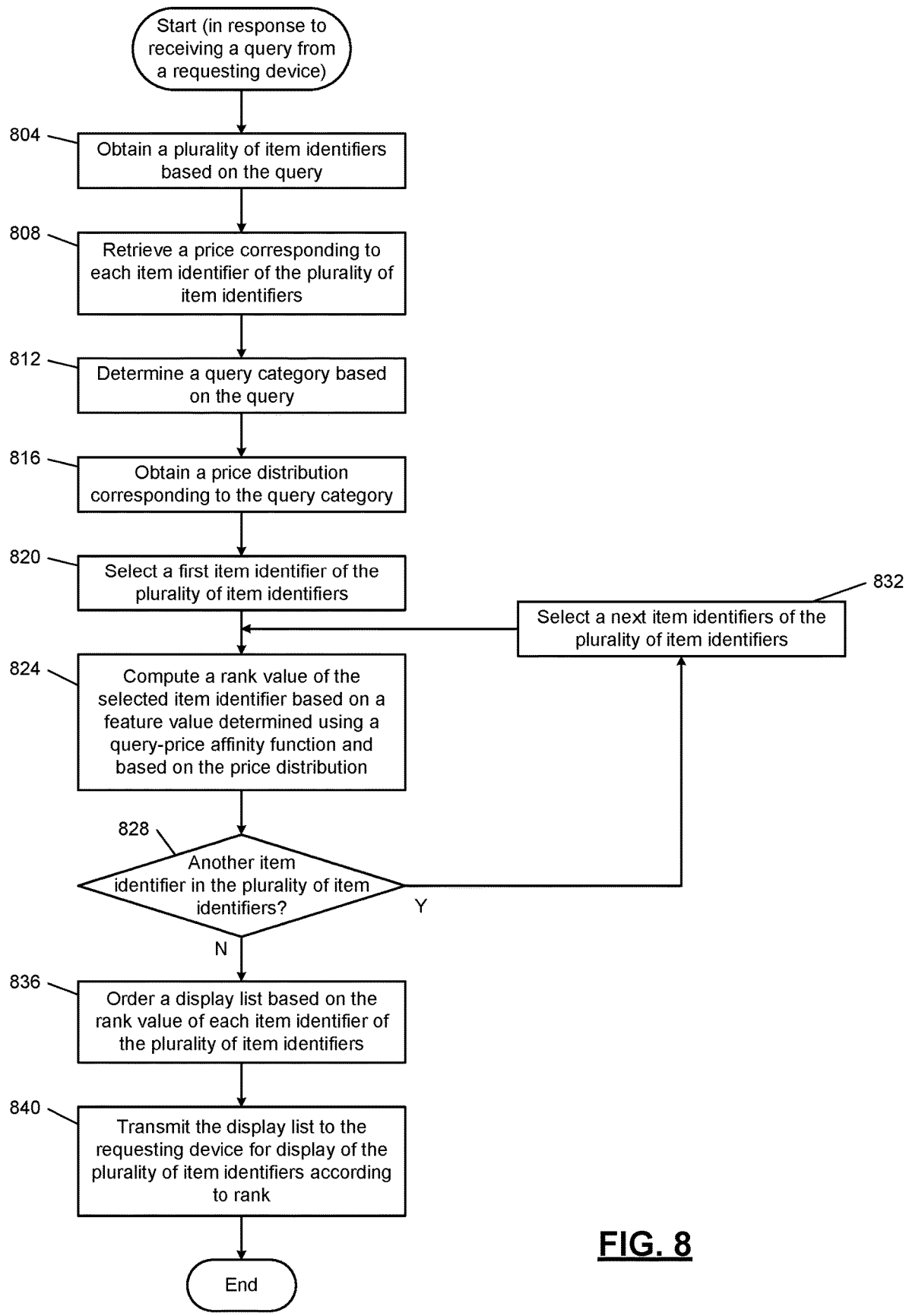
FIG. 8 is a flowchart of example methods of processing queries and ranking results in accordance with some embodiments.

Referring now to FIG. 8, an example of processing queries and ranking results is shown. Control begins in response to receiving a query from a requesting device, such as the customer device 104 of FIG. 1. Control continues to 804 to obtain a plurality of item identifiers based on the query. In various implementations, as mentioned previously, control may obtain the plurality of item identifiers by implementing a machine learning algorithm to identify item identifiers with a corresponding title or description similar to the query. The item identifiers may be ordered based on how similar the item title is to the query.

Control continues to 808 to retrieve a price or value corresponding to each item identifier of the plurality of item identifiers. At 812, control determines a query category of the query, for example, by comparing the query to a lookup table indexed by query category. Then, control proceeds to 816 to obtain a price distribution corresponding to the query category. Control continues to 820 to select a first item identifier of the plurality of item identifiers. In various implementations, control may select a first price of the obtained price distribution to determine a feature value for each price and apply the feature value to each item corresponding to the price.

At 824, control computes a rank value of the selected item identifier using a feature value and a plurality of pre-computed features (as described above, such as item popularity, a number of clicks, etc.). The feature value is computed using a query-price affinity function and based on the price distribution. Control proceeds to 828 to determine if another item identifier is in the plurality of item identifiers. If yes, control continues to 832 to select a next item identifier of the plurality of item identifiers and returns to 824. Otherwise, control proceeds to 836 to order a display list based on the rank value of each item identifier of the plurality of item identifiers. In various implementations, when the item identifiers are obtained at 804, the item identifiers are ordered according to relevance. Therefore, at 836, the item identifier ranks are updated based on the rank value determined at 824. In various implementations, the rank value may be multiplied by an original relevance or similarity value to re-rank the price of the items or the items. Control continues to 840 to transmit the display list to the requesting device for display of the plurality of item identifiers according to rank. Then, control ends.

Figure 9:
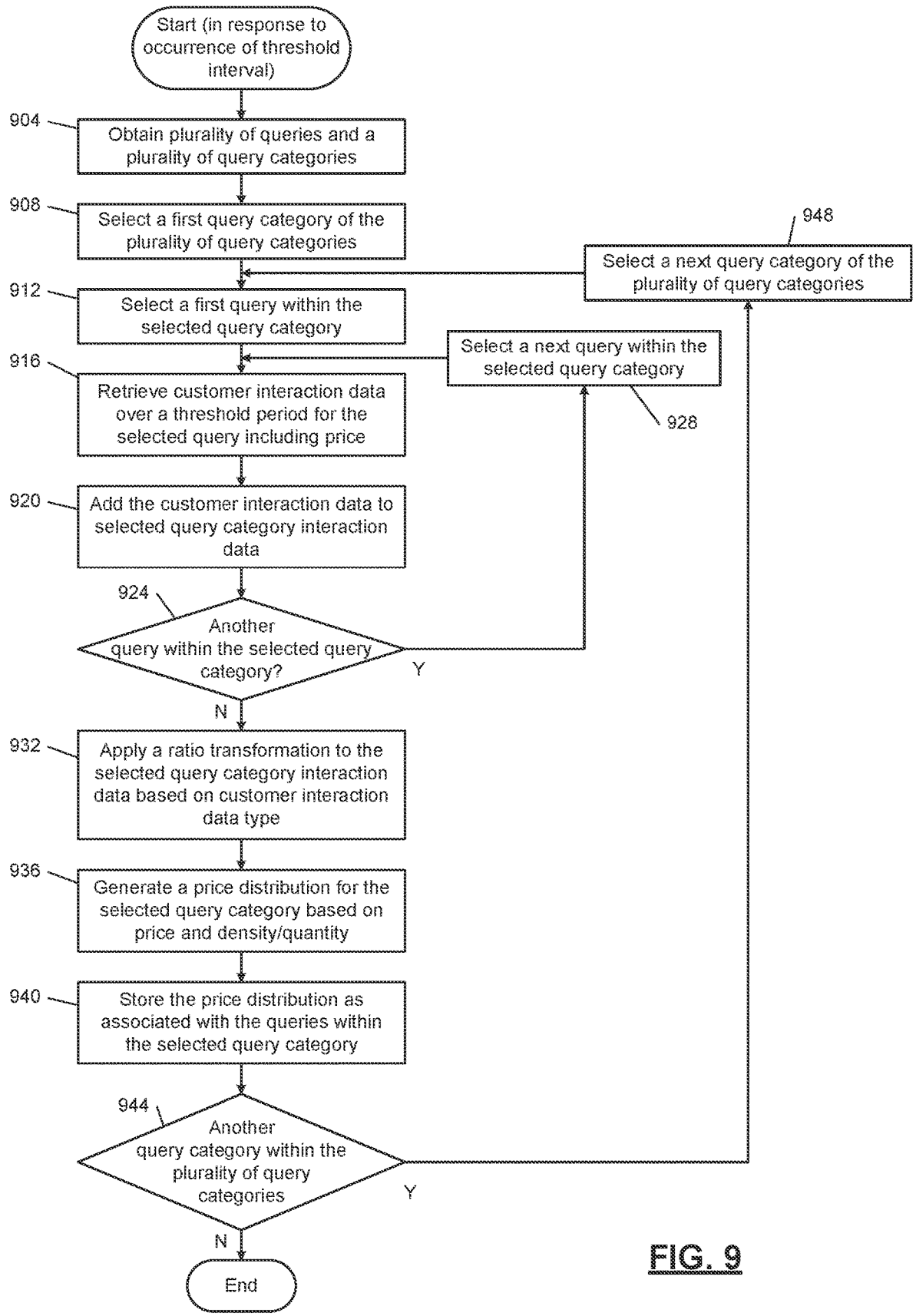
FIG. 9 is a flowchart of example methods of generating price distributions for query categories in accordance with some embodiments.

Referring now to FIG. 9, an example method of generating price distributions for query categories is shown. Control begins in response to the occurrence of a threshold interval. For example, control executes every 24 hours. Control proceeds to 904 to obtain a plurality of queries and a plurality of query categories, for example, stored in a database, such as the query category database 128 of FIG. 1. At 908, control selects a first query category of the plurality of query categories.

Control continues to 912 to select a first query within the selected query category. Control proceeds to 916 to retrieve customer interaction data for the selected query over a threshold period including a corresponding price. For example, control obtains customer interaction data for the selected query over the last 120 days. Control continues to 920 to add the customer interaction data to the selected query category interaction data. Control proceeds to 924 to determine whether another query is within the selected query category. If yes, control continues to 928 to select a next query within the selected query category and returns to 916. Otherwise, control proceeds to 932 to apply a ratio transformation to the selected query category interaction data based on the customer interaction type included in the query category interaction data.

For example and as mentioned previously, the customer interaction data may include a number of purchases, a number of add to carts, and a number of views. Therefore, the ratio transformation or weighting depends on whether the customer interaction data is a purchase, an add to cart, or a view. For example, the ratio transformation may be 10:4:1, multiplying the number of purchases by 10, multiplying the number of add to carts by 4, and multiplying the number of views by 1 (or rather, leaving the number of views unchanged).

Control proceeds to 936 to generate a price distribution for the selected query category based on price and density (quantity of customer interactions occurring at each price), for example, the graph shown in FIG. 6. Control continues to 940 to store to price distribution as associated with the queries within the selected query category. Control proceeds to 944 to determine if another query category is within the plurality of query categories. If no, control ends. Otherwise, if yes, control continues to 948 to select a next query category of the plurality of query categories and returns to 912.

Although the methods described above are with reference to the illustrated flowcharts, it will be appreciated that many other ways of performing the acts associated with the methods can be used. For example, the order of some operations may be changed, and some of the operations described may be optional.

In addition, the methods and system described herein can be at least partially embodied in the form of computer-implemented processes and apparatus for practicing those processes. The disclosed methods may also be at least partially embodied in the form of tangible, non-transitory machine-readable storage media encoded with computer program code. For example, the steps of the methods can be embodied in hardware, in executable instructions executed by a processor (e.g., software), or a combination of the two. The media may include, for example, RAMs, ROMs, CD-ROMs, DVD-ROMs, BD-ROMs, hard disk drives, flash memories, or any other non-transitory machine-readable storage medium. When the computer program code is loaded into and executed by a computer, the computer becomes an apparatus for practicing the method. The methods may also be at least partially embodied in the form of a computer into which computer program code is loaded or executed, such that, the computer becomes a special purpose computer for practicing the methods. When implemented on a general-purpose processor, the computer program code segments configure the processor to create specific logic circuits. The methods may alternatively be at least partially embodied in application specific integrated circuits for performing the methods.

The term model as used in the present disclosure includes data models created using machine learning. Machine learning may involve training a model in a supervised or unsupervised setting. Machine learning can include models that may be trained to learn relationships between various groups of data. Machine learned models may be based on a set of algorithms that are designed to model abstractions in data by using a number of processing layers. The processing layers may be made up of non-linear transformations. The models may include, for example, artificial intelligence, neural networks, deep convolutional and recurrent neural networks. Such neural networks may be made of up of levels of trainable filters, transformations, projections, hashing, pooling and regularization. The models may be used in large-scale relationship-recognition tasks. The models can be created by using various open-source and proprietary machine learning tools known to those of ordinary skill in the art.

The foregoing is provided for purposes of illustrating, explaining, and describing embodiments of these disclosures. Modifications and adaptations to these embodiments will be apparent to those skilled in the art and may be made without departing from the scope or spirit of these disclosures.

What is claimed is:

1. A system comprising:
 a query database comprising a lookup table;
 a non-transitory medium having instructions stored thereon; and
 a processor configured to read the instructions to:
  parse a received search query using a machine learning algorithm to identify one or more search terms associated with the search query;
  classify the received search query using a query classification model, wherein the query classification model comprises a natural language process and a k-means clustering process, and wherein the query classification model is trained by an iterative training process based on a training dataset including historical queries to classify the received search query into one of the plurality of existing query categories or a new query category;
  obtain a plurality of items based on the one or more search terms associated with the received search query and a corresponding value of each item in the plurality of items;

in response to classifying the received search query into one of the plurality of existing query categories:
retrieve a value distribution for the received search query, wherein the value distribution for the received search query is based on aggregated interaction data for each query in the query category of the received search query;
for each item of the plurality of items, generate a feature value based on the value distribution and the corresponding value of the item;
generate a ranked set of items by ranking the plurality of items by the feature value;
transmit instructions to a customer device that causes the customer device to display the ranked set of items in a user interface in a ranked arrangement based on the corresponding feature value, wherein the instructions include the ranked set of items;
store the received search query in the query database; and
update the lookup table to associate the received search query with the one of the plurality of existing query categories;
in response to classifying the received search query into the new query category:
transmit instructions to the customer device that causes the customer device to display the plurality of items;
store the received search query in the query database; and
update the lookup table to include the new query category; and
generate an update value distribution for an updated query category in the query database based on updated aggregated interaction data including interaction data associated with the received search query.

2. The system of claim 1, wherein generating the feature value for each item of the plurality of items includes:
identifying a minimum value threshold and a maximum value threshold based on the value distribution; and
generating a first feature value corresponding to the item in response to the corresponding value being between the minimum value threshold and the maximum value threshold.

3. The system of claim 1, wherein the processor is configured to, at a threshold interval:
obtain a set of customer interaction data over a threshold period, wherein the set of customer interaction data is associated with a query category of the plurality of existing query categories;
apply a ratio transformation to the set of customer interaction data; and
generate the value distribution of the query category using the ratio transformation of the set of customer interaction data and the corresponding value of each element of the ratio transformation of the set of customer interaction data.

4. The system of claim 3, wherein
each element of the set of customer interaction data corresponds to an interaction with an item; and
the set of customer interaction data includes customer interaction data for each query included in the query category.

5. The system of claim 4, wherein the processor is configured to access the lookup table to identify each query included in the query category.

6. The system of claim 4, wherein the value distribution corresponding to the query category is applied to each query included in the query category.

7. The system of claim 4, wherein the processor is configured to aggregate customer interaction data for each query included in the query category into the set of customer interaction data.

8. The system of claim 4, wherein each element of the customer interaction data include at least one of: (i) a number of item purchases, (ii) a number of item selections for purchase, and (iii) a number of item views.

9. The system of claim 3, wherein the processor is configured to generate the value distribution by determining a total number of customer interactions corresponding to a value based on the ratio transformation of the set of customer interaction data, and wherein each element of the ratio transformation of the set of customer interaction data corresponds to a respective value.

10. A computer-implemented method comprising:
parsing a received search query using a machine learning algorithm to identify one or more search terms associated with the search query;
classifying the received search query using a query classification model, wherein the query classification model comprises a natural language process and a k-means clustering process, and wherein the query classification model is trained by an iterative training process based on a training dataset including historical queries to classify the received search query into one of the plurality of existing query categories or a new query category;
obtaining a plurality of items based on the one or more search terms associated with the received search query and a corresponding value of each item in the plurality of items;
in response to classifying the received search query into one of the plurality of existing query categories:
retrieving a value distribution for the received search query, wherein the value distribution for the received search query is based on aggregated interaction data for each query in the query category of the received search query;
for each item of the plurality of items, generating a feature value based on the value distribution and the corresponding value of the item;
generating a ranked set of items by ranking the plurality of items by the feature value;
transmitting instructions to a customer device that causes the customer device to display the ranked set of items in a user interface in a ranked arrangement based on the corresponding feature value, wherein the instructions include the ranked set of items;
storing the received search query in a query database; and
updating a lookup table to associate the received search query with the one of the plurality of existing query categories;
in response to classifying the received search query into the new query category:
transmitting instructions to the customer device that causes the customer device to display the plurality of items;
storing the received search query in the query database; and
updating the lookup table to include the new query category; and generating an update value distribution for an updated query category in the query database based on updated aggregated interaction data including interaction data associated with the received search query.

11. The method of claim 10, wherein generating the feature value for each item of the plurality of items by:
identifying a minimum value threshold and a maximum value threshold based on the value distribution; and
determining a first feature value corresponding to the item in response to the corresponding value being between the minimum value threshold and the maximum value threshold.

12. The method of claim 10, further comprising, at a threshold interval:
obtaining a set of customer interaction data over a threshold period, wherein the set of customer interaction data is associated with a query category of the plurality of existing query categories;
applying a ratio transformation to the set of customer interaction data; and
generating the value distribution of the query category using the ratio transformation of the set of customer interaction data and the corresponding value of each element of the ratio transformation of the set of customer interaction data.

13. The method of claim 12, wherein
each element of the set of customer interaction data corresponds to an interaction with an item; and
the set of customer interaction data includes customer interaction data for each query included in the query category.

14. The method of claim 13, further comprising accessing the lookup table to identify each query included in the query category.

15. The method of claim 13, wherein the value distribution corresponding to the query category is applied to each query included in the query category.

16. The method of claim 13, further comprising aggregating customer interaction data for each query included in the query category into the set of customer interaction data.

17. The method of claim 12, further comprising generating the value distribution by determining a total number of customer interactions corresponding to a value based on the ratio transformation of the set of customer interaction data, and wherein each element of the ratio transformation of the set of customer interaction data corresponds to a respective value.

18. A non-transitory computer readable medium having instructions stored thereon, wherein the instructions, when executed by at least one processor, cause a device to perform operations comprising:

parsing a received search query using a machine learning algorithm to identify one or more search terms associated with the search query;
classifying the received search query using a query classification model, wherein the query classification model comprises a natural language process and a k-means clustering process, and wherein the query classification model is trained by an iterative training process based on a training dataset including historical queries to classify the received search query into one of the plurality of existing query categories or a new query category;
obtaining a plurality of items based on the one or more search terms associated with the received search query and a corresponding value of each item in the plurality of items;
in response to classifying the received search query into one of the plurality of existing query categories:
retrieving a value distribution for the received search query, wherein the value distribution for the received search query is based on aggregated interaction data for each query in the query category of the received search query;
for each item of the plurality of items, generating a feature value based on the value distribution and the corresponding value of the item;
generating a ranked set of items by ranking the plurality of items by the feature value;
transmitting instructions to a customer device that causes the customer device to display the ranked set of items in a user interface in a ranked arrangement based on the corresponding feature value, wherein the instructions include the ranked set of items;
storing the received search query in a query database; and
updating a lookup table to associate the received search query with the one of the plurality of existing query categories;
in response to classifying the received search query into the new query category:
transmitting instructions to the customer device that causes the customer device to display the plurality of items;
storing the received search query in the query database; and
updating the lookup table to include the new query category; and
generating an update value distribution for an updated query category in the query database based on updated aggregated interaction data including interaction data associated with the received search query.

* * * * *